April 4, 1939.                F. BUCCELLA                  2,153,234
                         BRAKE MECHANISM FOR SLEDS
                          Filed Dec. 23, 1936              2 Sheets-Sheet 1

Inventor.
Fred Buccella
atty

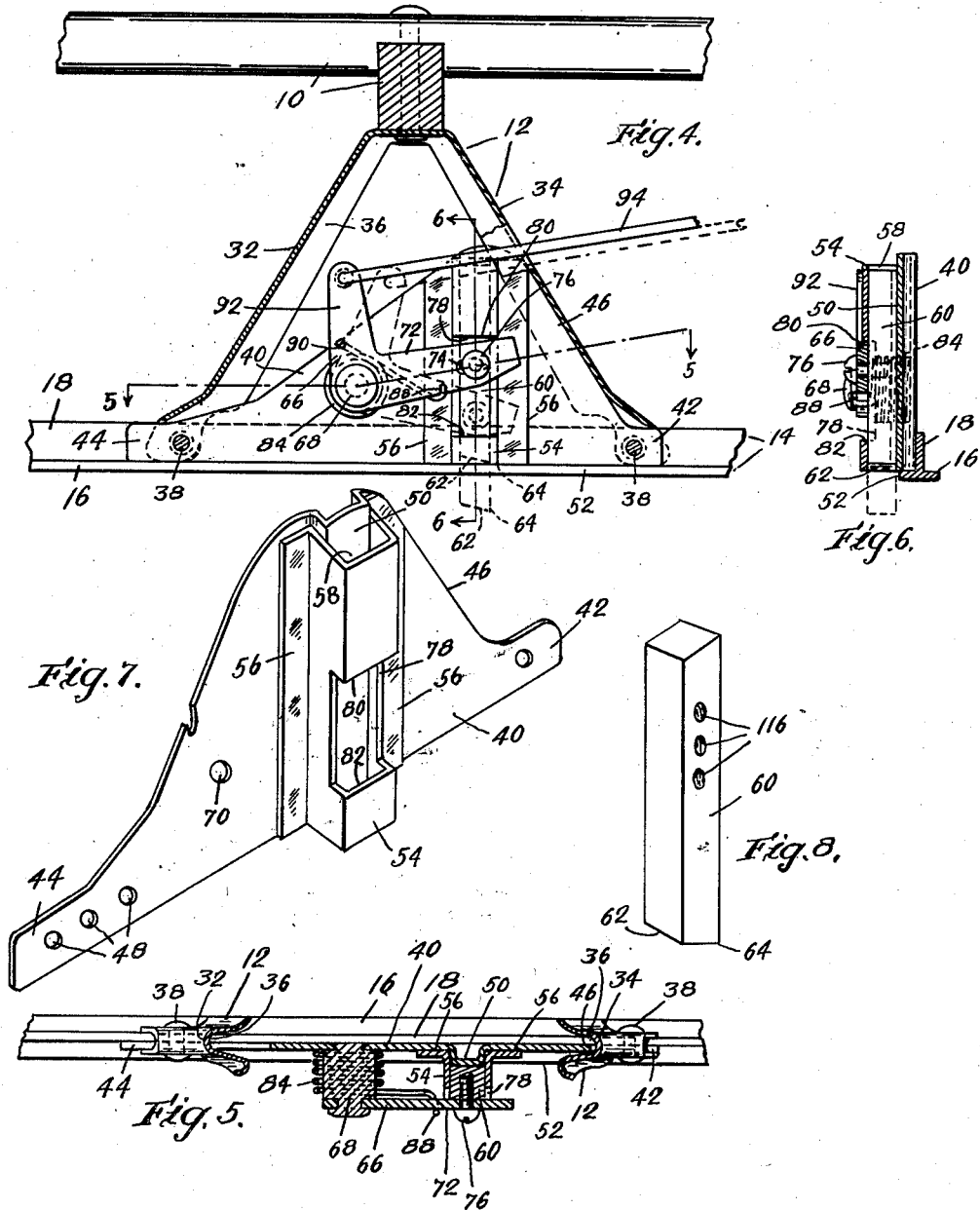

Patented Apr. 4, 1939

2,153,234

UNITED STATES PATENT OFFICE 2,153,234

BRAKE MECHANISM FOR SLEDS

Fred Buccella, Winchester, Mass.

Application December 23, 1936, Serial No. 117,308

9 Claims. (Cl. 188—8)

This invention relates to sleds and to brake mechanism therefor operative frictionally to engage and dig into the surface over which the sled is moving for the purpose of slowing down the speed of, or stopping, the sled.

While it has been proposed heretofore to provide sleds and especially a child's sled with brake mechanism, it is a fact that such sleds equipped with brake mechanisms, while desirable, are commercially unavailable.

The usually proposed brake mechanism includes a pivoted brake dog, the dog either pointing forwardly or rearwardly of its pivot and adapted to be moved downwardly into engagement with the ice or snow, hereinafter termed the ground, over which the sled may be travelling by mechanism operated by the rider. Such mechanism has been found to be unsatisfactory for the purpose. If the brake dog points forwardly no control of the braking effect is ordinarily possible. When the forwardly pointing dog engages the ground it catches therein so that the control is taken away from the rider and the dog is pulled downward as far as it can go, and that part of the sled overlying the dog is raised off the ground. Such dogs are effective to stop the sled but are not effective in merely momentarily checking the speed as may be desirable for instance in making a curve since, once the dogs catch in the ground, the control thereof is taken away from the rider. Furthermore, the raising of the sled can be a cause of accident to the child either by pitching the child forwardly on the sled or by causing the upsetting of the sled. The dogs usually also lock in operated position and the sled has to be upturned and the dogs manually restored to their inoperated position before the sled can be used again. When the dogs point rearwardly some braking effect is possible but ordinarily the braking effect is not sufficient to stop the sled quickly enough to be valuable since the force that applies the brakes is opposed by a strong component of the drag on the dogs that tends to move the dogs forcibly away from engagement with the ground. It is quite probable that for these reasons brake-equipped sleds have not been commercially produced.

It is an object of the present invention to provide brake mechanism for sleds wherein the brake member that engages the ground is so arranged and supported that the drag thereon cannot in any serious manner modify the brake applying pressure thereon either to cause the brake member to engage the ground more strongly or to tend to move it out of engagement with the ground.

A further object of the invention is the provision of brake mechanism for sleds wherein the ground-engaging brake member comprises, in principle, a bolt that is substantially vertically movable with respect to the runner of the sled and is supported in such manner that the drag on the bolt has no harmful tendency toward moving the bolt vertically.

The brake mechanism of the present invention is especially adapted for application to sleds of the so-called flexible runner type wherein the runner is connected to the body of the sled by means of an inverted V-shaped bracket. In different sizes of sleds the brackets have different dimensions or at least the spread between the legs of the bracket may be different. The brake mechanism is carried by a supporting plate which is conveniently located between the legs of a bracket and secured to the runner by the same rivets that secure the bracket to the runner. It is a further object of the present invention to provide a supporting plate so arranged that it can be used with brackets of different sizes, or spreads, of legs, and hence be applicable without change to different sizes of sleds.

In the flexible runner type of sled the flexing of the runners for the purpose of steering the sled is effected usually by a swinging handle or cross bar located on the front part of the sled and usually pivoted to, or connected to pivotally supported, runner flexing mechanism. It is an object of the present invention to provide such a sled with two brake mechanisms, one on each runner, and an actuating handle for both mechanisms carried by the cross bar, together with an operating linkage between the handle and the two brake mechanisms so arranged that the tilting of the cross bar to steer the sled is prevented from actuating one or the other of the brake mechanisms.

A yet further object of the invention is the provision of a flexible runner type of sled having a pair of brake mechanisms connected by a pull wire or rod arranged as a loop, the middle of the loop being engaged by a second pull member located in the median line of the sled and connected by appropriate mechanism to an actuating handle pivoted to the cross bar of the sled and so arranged that the second pull member is always located substantially in the median line of the sled irrespective of angularly displaced positions of the cross bar so that the condition of the braking mechanism is not harmfully affected by the steering of the sled.

Another object is generally to improve the construction and operation of brake mechanisms for sleds.

Fig. 4 is an enlarged sectional detail taken along line 4—4 of Fig. 1.

Fig. 5 is a sectional view taken along line 5—5 of Fig. 4.

Fig. 6 is a sectional detail taken along line 6—6 of Fig. 4.

Fig. 7 is a perspective view of the supporting plate of Fig. 4.

Fig. 8 is a perspective view of a brake member.

Figure 1:
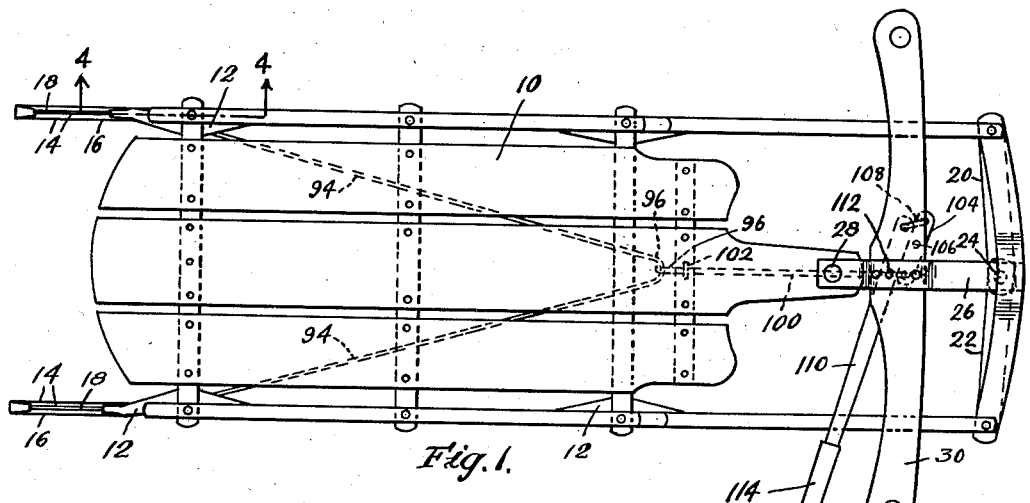
Fig. 1 is a plan view of a flexible runner sled embodying the present invention.
Figure 2:
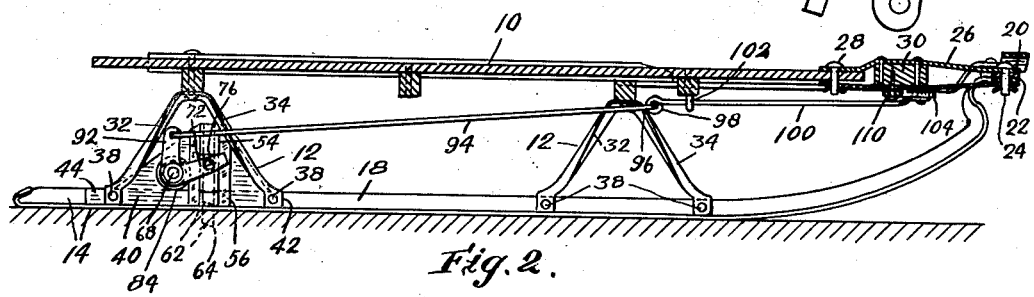
Fig. 2 is a sectional elevation taken through the longitudinal axis of the sled.

The sled herein chosen to illustrate the invention is of the flexible runner type and comprises a body 10 connected through brackets 12 to runners 14, the runners being of inverted T-shape, each having the float bottom member 16 and upstanding median ribs 18. The forward ends of the runners are connected by links 20 and 22 which are pivotally connected together at 24 and pivoted to the forward end of a link 26, the rear end of which is pivoted at 28 to the body 10. A steering or cross-arm 30 is fixed to the link 26. A pull on one end or the other of the cross bar causes the link 26 to pivot in one direction or the other and to correspondingly effect the lateral flexing of the runners. The brackets 12 that connect the runners and sled body are of generally inverted V-shaped formation and are provided with divergent legs 32 and 34, see especially Figs. 4 and 5, the legs being of channel shape with the channels 36 confronting each other. The lower ends of the legs straddle the upstanding ribs 18 of the runners and are secured rigidly thereto by rivets 38. The sled as above described may be considered typical of a flexible runner sled although there may be differences of construction in different makes of such sleds. The invention, however, is not restricted to application on this type of sled.

The sled is provided with two brake mechanisms, one for each runner. The mechanisms are identical except that they are rights and lefts and but one mechanism need be described.

The brake mechanism includes a supporting plate 40 which in general is of triangular shape and is provided at its ends with forwardly and rearwardly extended attaching ears 42 and 44, see especially Fig. 7. The plate is adapted to be located within a rear bracket 12 and preferably although not necessarily has its forward edge 46 located in the channel 36 of the front bracket leg 34 which provides lateral support therefor. The lower part of the plate lies against the inner face of the rib 18 of a runner with the ears 42 and 44 in the feet of the legs, the ears being secured to the runner by the aforesaid rivets 38. One of the attaching ears of the plate, as the ear 44, is preferably made long enough so that it can be secured to the runner by the same rivet that secures brackets having different spreads of legs to the runner. For this purpose the attaching ear can be provided with a plurality of rivet holes 48, each of which is adapted to receive the attaching rivet for a different size of bracket.

The supporting plate 40 is reflexed to provide a raised bolt supporting ledge 50 which projects outwardly from the face of the plate sufficiently to be in line with or project inwardly slightly beyond the inner edge 52 of the runner so as to permit the bolt that is vertically reciprocable on said ledge to move downwardly in front of the edge 52 of the runner. Said supporting plate is also provided with a channel shaped bolt housing 54 which is seated upon the plate over the ledge 50 and has outstanding attaching feet 56 that are spot welded or otherwise secured to the plate. The bolt housing and the ledge 50 cooperate to form an elongated vertical rectangular bolt receiving passage 58 in which a rectangular brake bolt 60 is closely fitted and is vertically reciprocable.

The lower face 62 of said brake bolt is relieved rearwardly so as to provide a forward cutting edge 64 that can dig into the surface over which the sled may travel. The bolt is moved downwardly below the face of the runner and also is retrieved to a position above the runner face by means including a bell crank lever 66 pivoted upon a stud pin 68 fixed in an attaching hole 70 of the supporting plate rearwardly of the bolt. Said bell crank lever has a forwardly extending arm 72 that overlies the bolt and is provided with a longitudinally elongated slot 74 in which a screw or other projection 76 of the bolt is passed.

The bolt housing 54 is provided with a vertically elongated opening 78 in which the bell crank arm 72 can reciprocate, the upper and lower edges 80 and 82 of the opening constituting abutments adapted to be engaged by the crank arm to limit the uppermost and lowermost positions of the brake bolt. The brake bolt is held yieldingly in elevated position by a coil spring 84 which encircles the stud pin 68 and has one end 88 engaged with the crank arm 72 and the other end 90 engaged with the supporting plate 40, the pressure of the spring acting constantly to urge the crank arm 72 and brake bolt in a vertical direction. The bell crank lever 66 is provided with an upstanding arm 92 that is connected to a brake operating linkage.

Figure 3:
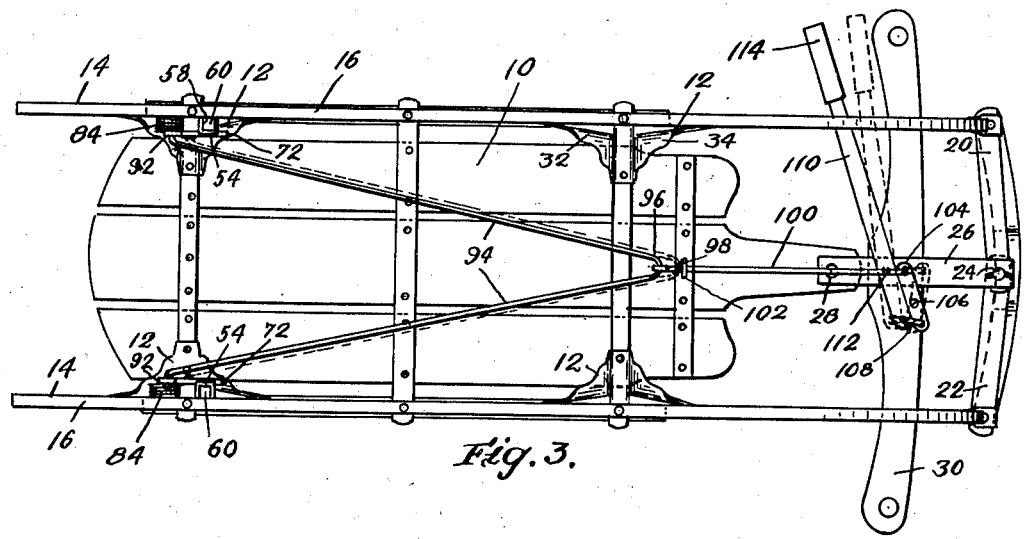
Fig. 3 is an obverse view of the sled.

Said linkage includes a pull cable or rod arranged in the form of a loop and having its legs or tension members 94 connected each to a separate one of the arms 92 of the two mechanisms, see especially Figs. 1 and 3. The middle portion 96 of the loop is connected loosely to, as being threaded through the eye 98 of a pull member 100, which at its rear end is slidably passed through an eye 102 carried by the body 10. Said pull member 100 is located substantially in the median line of the sled and the forward end thereof is pivotally connected to one end of a short lever 104 which is pivoted intermediate its ends at 106 to the under face of the cross bar 30 of the sled. The other end of the short lever 104 is pivotally connected through a link 108 to the end of an actuating lever 110, said lever being pivoted at 112 to the steering link 26. Said lever 110 is provided with a handle 114 which is disposed close enough to the end of the cross bar so that the hand can bridge the space therebetween and move the lever forwardly to set the brake. The use of the short lever 104 is desirable in multiplying the movement of the brake actuating lever in the pull member 100 and also for maintaining the pull rod 100 substantially in the median line of the sled irrespective of the angular positions assumed by the cross bar 30 and the steering link 26 in flexing the runners to steer the sled, so that the brake mechanism is not operated as a result of steering the sled.

With the construction described the forward movement of the brake lever exerts tension on the connecting parts 94 and 100 and causes the brake bolts to be moved below the running faces of the runners and thereby to engage and dig into the ground over which the sled is moving and thereby to resist such movement. The brakes can be applied to a greater or lesser degree, as may be desired, by a proper positioning of the brake operating lever. The brakes are also under the control of the occupant of the sled and can be set to the extent desired and released at the will of the rider. The drag on the brake bolt does not affect the brake applying force, either by causing the brake bolt to dig more deeply into the supporting surface of or tend to disengage such surface as has been the case heretofore, since the brake bolt is vertically movable with respect to the line of drag thereon and is supported against lateral movement or tilting by the housing in which it operates. Thus the drag on the bolt is resisted by the housing and there is no appreciable component of drag that tends to move the brake bolt either in a brake setting or a brake releasing position.

The mechanism as described can bring a rapidly moving sled on a steep hill with a heavy rider to a standstill in a short distance, as seven feet, and a shorter distance with a lighter rider.

The speed of the sled can also be reduced momentarily as may be desired by a suitable application of the brake mechanism.

The brake bolt preferably is made of a hard wear-resistant material. When the end of the brake bolt becomes worn so that it does not project below the runner sufficiently to be satisfactorily effective its point of connection with its associated bell crank lever can be changed as by providing the bolt with a plurality of screw holes 116 located one above the other into any one of which the screw 76 that connects the bolt and bell crank together can be screwed so as properly to adjust the length of the bolt that is below the bell crank.

I claim:

1. In a brake mechanism for sleds, a supporting plate having means for securing the plate to a sled runner and outstanding means providing an elongated straight guideway of non-circular cross-section overhanging one side of the runner, a ground engaging brake member having a corresponding non-circular part reciprocable in a straight line in said guideway, and means carried by said plate having a part overlying the side of said guideway for reciprocating said brake member.

2. In a brake mechanism for sleds having runners provided with upstanding longitudinal ribs, a supporting plate having means for attachment to a runner rib and outstanding means providing an elongated straight guideway of square cross-section overhanging a side of the runner, a rectangular brake member reciprocably located in said guideway at the side of the runner, a stud carried by and outstanding from said plate at one side of said guideway, a brake operating lever having a pivotal connection with said stud and a loose connection with said brake member, and a lever-retracting spring coiled over said stud and in engagement with said plate and lever.

3. In a brake mechanism for sleds, a supporting plate having a raised brake member supporting ledge, a housing on said plate over said ledge and forming therewith an elongated straight guideway of rectangular cross-section, a rectangular brake member slidable in said passage, and means for reciprocating said brake member.

4. In a brake mechanism for sleds, a supporting plate having a raised brake member supporting ledge, a housing on said plate over said ledge and forming therewith an elongated straight guideway of rectangular cross-section, a rectangular brake member slidable in said passage, said housing having an opening therein which exposes a part of said brake member, a pivot stud carried by said plate, a lever on said stud having a part located in said opening and having a loose connection with the exposed part of said brake member, the upper and lower walls of said opening constituting stops engaged by said lever for limiting movements thereof.

5. In a brake mechanism for sleds, a supporting plate having a raised brake member supporting ledge, a housing on said plate over said ledge and forming therewith an elongated straight guideway of rectangular cross-section, a rectangular brake member slidable in said passage, said housing having an opening therein which exposes a part of said brake member, a pivot stud carried by said plate, a lever on said stud having a part located in said opening and having a loose connection with the exposed part of said brake member, the upper and lower walls of said opening constituting stops engaged by said lever for limiting movements thereof, and a coil spring encircling said stud having one end anchored by said plate and the other end connected to said lever and operative to urge said lever and brake member toward an unoperated position thereof.

6. In a brake mechanism for sleds, a supporting plate adapted to be carried by the sled runner having on one face of the plate an outstanding vertically elongated straight guideway that is perpendicular to and outstands beyond a side of the runner of the sled, a ground-engaging brake bar reciprocable in a straight line in said guideway and at the side of the runner into positions above and below the runner face, and a lever pivoted to said plate at one side of said guideway having a part overlying said guideway provided with operative connection with said brake bar for reciprocating it.

7. In a brake mechanism for sleds having runners with upstanding median ribs, a supporting plate adapted to lie alongside a runner rib and having an outstanding vertical ledge that projects outwardly at least to the edge of the runner, means carried by said plate for holding a brake member for sliding movement on and lengthwise of said ledge, a ground-engaging brake member slidable vertically on said ledge, and means carried by said plate for reciprocating said brake member.

8. In a brake mechanism for a flexible runner sled having a swinging steering frame, a ground-engaging brake member associated with each sled runner, a short lever pivoted to the swinging steering frame and having one end located in the median line of the sled, a link located in the median line of the sled and connected at its forward end to said end of said lever, other linkages connected to the rear end of said link and separately to said brake mechanisms, and a brake actuating lever pivoted to the steering frame and having an operative connection with said short lever.

9. A brake mechanism for sleds comprising a plate having a part arranged for attachment to the sled runner, a channel member vertically attached to one face of said plate and outstanding therefrom so that its channel overhangs the side of the runner, and a ground-engaging brake bar vertically movable in said channel member in a straight line normal to the runner, and a lever pivoted to said plate at one side of said channel having a part overlying said channel member provided with an operative connection with said bar.

FRED BUCCELLA.